UNITED STATES PATENT OFFICE.

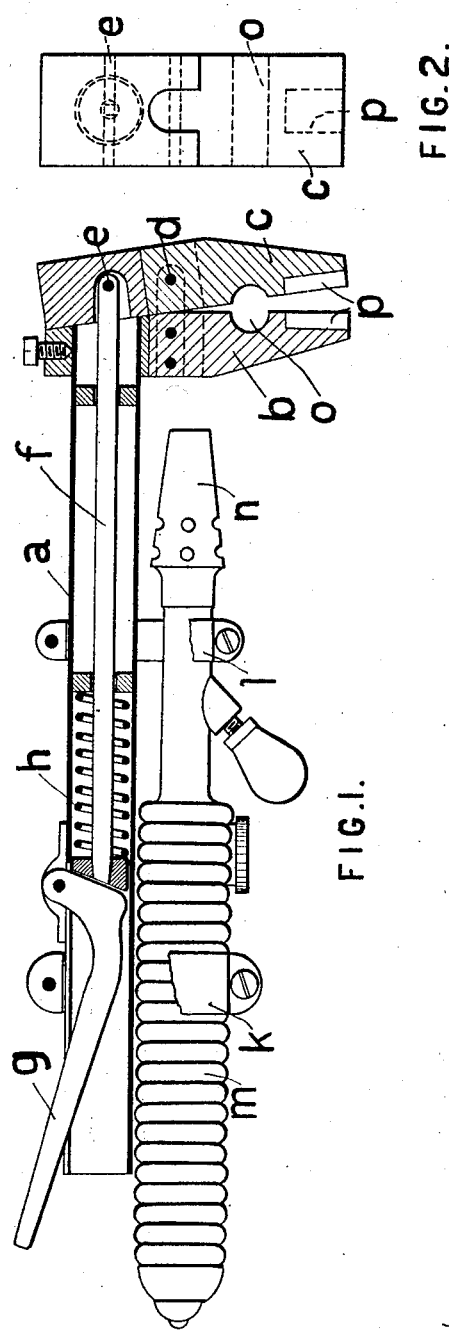

JACOB HENDRIK van VIERSEN, OF THE HAGUE, NETHERLANDS.

SOLDERING-IRON.

1,332,937.　　　　　Specification of Letters Patent.　　Patented Mar. 9, 1920.

Application filed September 11, 1917. Serial No. 190,820.

*To all whom it may concern:*

Be it known that I, JACOB HENDRIK VAN VIERSEN, electrician, a subject of the Queen of the Netherlands, residing at The Hague, the Netherlands, have invented certain new and useful Improvements in Soldering-Irons, of which the following is a specification.

The present invention relates to improvements in soldering irons.

In ordinary practice the joining of the ends of non-insulated wires of electric lines, telegraph or telephone lines, for example, is often effected in such a manner that the ends are placed and kept one against the other and then wound with copper wire, the ends being at the same time bent in order to prevent detachment. The copper wire winding and the wire ends to be joined lying within it are then soldered together by means of a benzin soldering lamp and a rod of lead tin solder.

With this manner of joining spilling solder and a consequent relatively high tin waste cannot be prevented, while moreover a somewhat imprudent management results in the danger of the junction being broken by superheating the wires if the latter have to be joined with a certain tension.

Now the purpose of the present invention is to avoid this drawback and this danger by not joining the wires by means of a soldering lamp but by means of a soldering iron of improved construction. The head of this iron consists of two or more parts which together form a pair of jaws adapted to be closed for forming the junction. Though not necessary it is efficient to heat the head which is composed of a number of movably connected parts by means of a narrow benzin flame in the manner known for ordinary soldering irons.

This iron is also very useful for joining insulated wires by means of soldering tubes as described in the specification of a concurrent application.

The parts of the iron formed as jaws are provided with grooves corresponding, when the jaws are closed, in the former case with the diameter of the copper wire winding and in the second case with the shape of the soldering tubes.

The invention is hereinafter described with reference to the accompanying drawing in which:

Figure 1 shows a soldering iron partly in longitudinal section and partly in side view; and Fig. 2 is a front view of said iron.

As shown in the accompanying drawing, the reference letter *a* indicates the tube shaped handle carrying the fixed part *b* of the head to which the movable part *c* is pivotally connected at *d*. This movable part is connected at *e* to the end of the rod *f* located in the tube *a* and adapted to be pushed outwardly against the pressure of the spring *h* by means of the lever *g* so as to close the jaws formed by the parts *b* and *c*. The usual heating element *m n* is attached by means of clamps *k* and *l* to the tube *a*. The fixed part *b* of the head is directly heated by it, the part *c* indirectly by conduction of heat from the fixed part *b*. A close contact of the parts *b* and *c* in their position of rest is, therefore, of importance. The parts *b* and *c* have grooves *o* and *p* corresponding approximately when the jaws are closed, with the dimensions of the parts to be soldered; the grooves *o* with the wire wound around the ends of the non-insulated wires, the grooves *p* with the soldering tube for the junction of the ends of insulated lines.

As distinguished from the usual soldering irons the head of the iron according to the invention should in general have the grooves of very definite dimensions. It is advantageous to connect the jaws in an interchangeable manner to the other parts of the tool, so that in case the grooves become worn or damaged or in case material of different dimensions has to be soldered, other jaws may be substituted without discarding the whole tool.

Having now particularly described and ascertained the nature of my said invention and in what manner the same is to be performed, I declare that what I claim is:

1. In a soldering iron the combination of a head consisting of two pivotally connected jaws provided with grooves adapted to embrace the objects to be soldered, a tube shaped handle to which one of said jaws is attached, a rod to which the other jaw is attached. this rod being located in the handle and adapted to be longitudinally displaced to close the jaws, a spring for holding the last mentioned jaw in open position and a heating element carried by the iron for heating the head.

2. In a soldering iron the combination of a head consisting of two pivotally connected jaws provided with grooves adapted to embrace the objects to be soldered, a tube shaped handle to which one of said jaws is attached, a rod to which the other jaw is attached, this rod being located in the handle and adapted to be longitudinally displaced to close the jaws, a spring for holding the last mentioned jaw in open position, and a heating element attached to the handle and adapted to heat the head.

3. A soldering iron comprising a tubular handle provided at one end with a fixed laterally extending jaw, a movable laterally extending jaw pivotally connected with the fixed jaw, a rod located within the tubular handle and pivotally connected at one end to the movable jaw, a spring located within the handle and acting on the rod for holding the movable jaw in open position, a hand engaging member engaging the rod for moving the movable jaw into closed position, and a heating element carried by the handle for heating said jaws.

In testimony whereof I affix my signature in presence of one witness.

JACOB HENDRIK van VIERSEN.

Witness:
PLANTI VIBURE.